Aug. 4, 1925. 1,548,655
H. C. BRAUNSCHWEIG
WASHING APPARATUS
Filed March 18, 1922 2 Sheets-Sheet 1
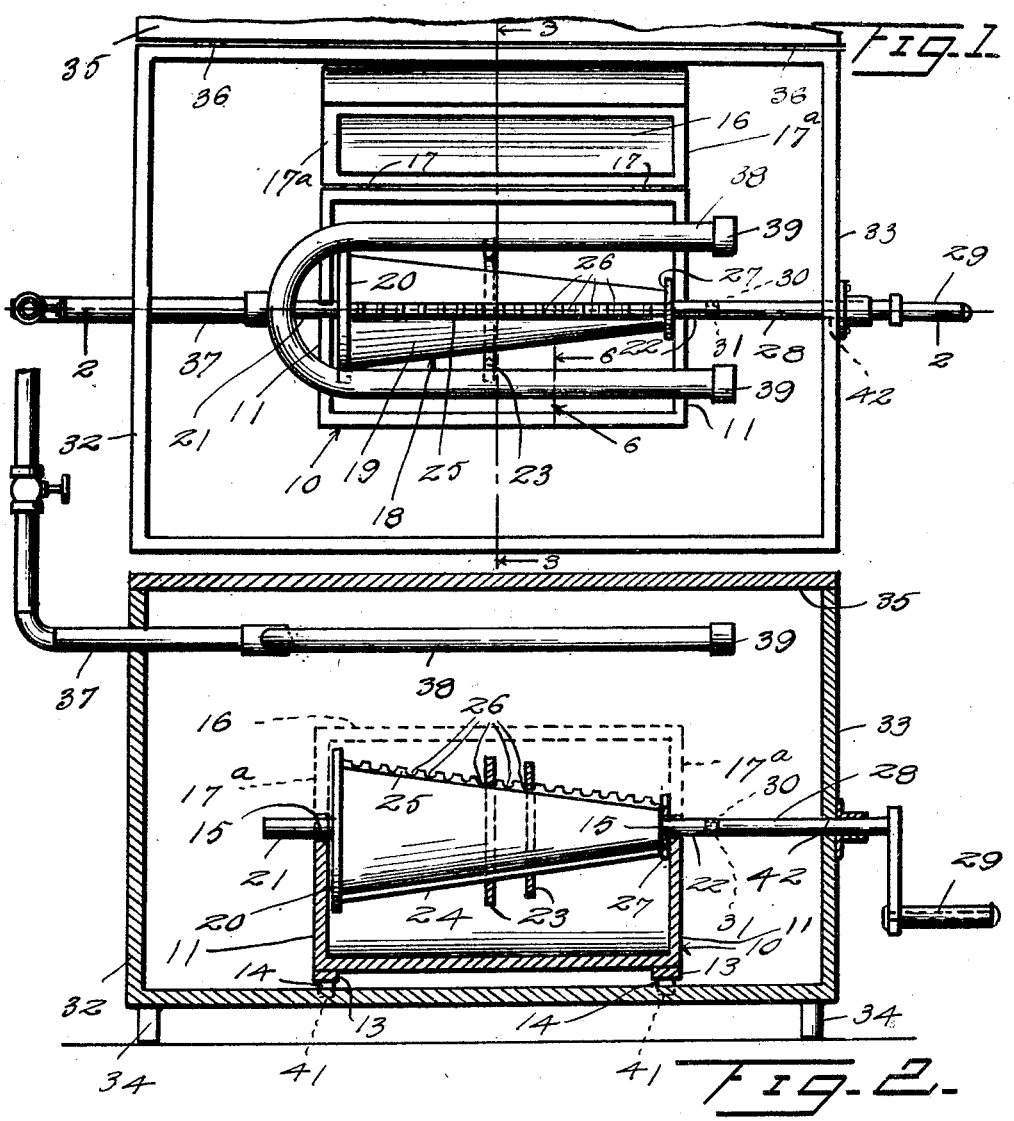
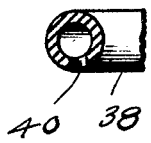
Inventor
H.C.Braunschweig

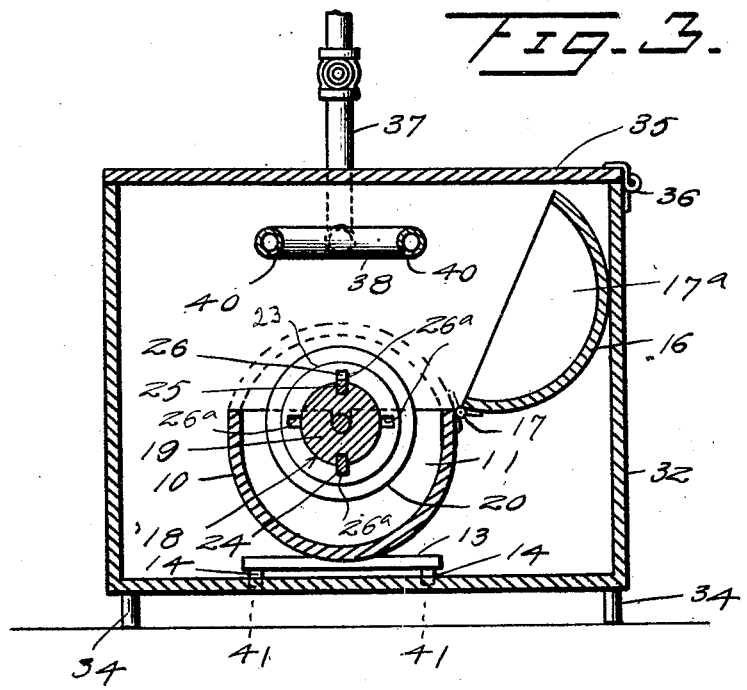
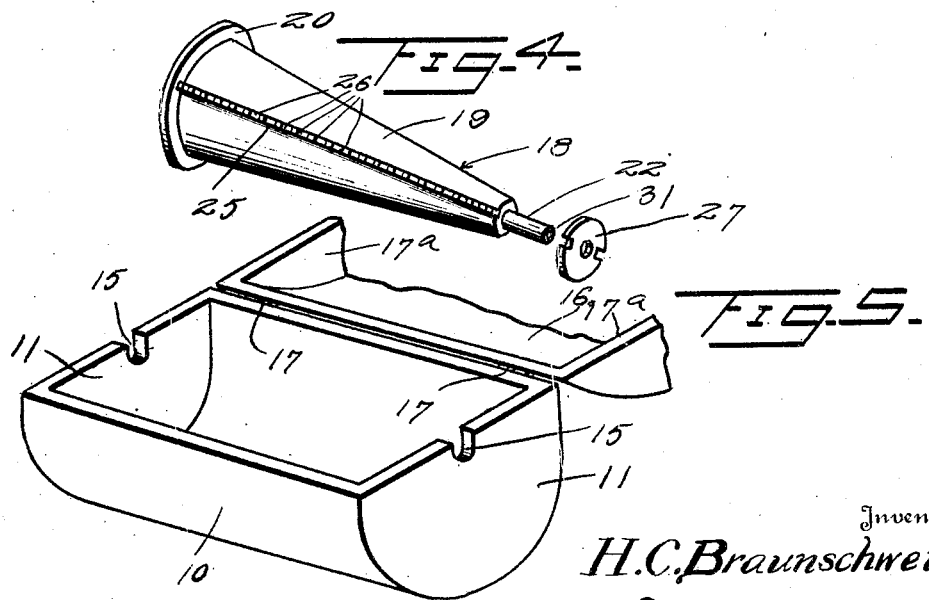

Patented Aug. 4, 1925.

1,548,655

UNITED STATES PATENT OFFICE.

HERMAN C. BRAUNSCHWEIG, OF CLYMAN, WISCONSIN.

WASHING APPARATUS.

Application filed March 18, 1922. Serial No. 544,884.

*To all whom it may concern:*

Be it known that I, HERMAN C. BRAUNSCHWEIG, a citizen of the United States, residing at Clyman, in the county of Dodge and State of Wisconsin, have invented certain new and useful Improvements in Washing Apparatus; and I do hereby declare the following to be a full, clear, and exact description of the invention, such as will enable others skilled in the art to which it appertains to make and use the same.

This invention relates to a washing apparatus.

One important object is to provide a novel and efficient construction in which the disks of cream separators and the like may be thoroughly cleansed.

A second prime object is to provide a construction of washing apparatus particularly adapted for cleansing the disks used in a De Laval cream separator and which will permit reception of said disks in the same relative order in which they are used in the separator so as to avoid disarranging them and the consequent loss of time and efficiency required to rearrange them before replacement in the separator.

Another important object is to provide a drum or cylinder for assembly of the separator disks thereon and which drum may be made in separable parts to facilitate attachment and detachment of the disks.

A further object is to provide a steam chest adapted to receive a water container in which the drum or cylinder is disposable for rotation.

Additional objects and advantages will become apparent from a consideration of the description following taken in connection with accompanying drawings.

In said drawings:—

Figure 1 is a plan view of the apparatus with the cover or closure of the steam chest open to expose the interior parts;

Figure 2 is a central longitudinal sectional view on the line 2—2 of Figure 1;

Figure 3 is a transverse sectional view on the line 3—3 of Figure 1;

Figure 4 is a detail perspective view showing the drum and associated parts in disassociated relation;

Figure 5 is a detail perspective view of the water container and drum support;

Figure 6 is a detail cross sectional view along the line 6—6 of Figure 1 to show the angularity of the discharge ports of the said nozzle.

Like reference characters designate like or similar parts in the different views.

In reducing the invention to practice, a suitable container is provided at 10, preferably having an arcuate wall to form its sides and bottom as shown and end walls at 11. In order that the container or receptacle 10 may rest flat on a support, rests in the form of bars 13 are secured thereto, preferably one at each end, and which have depending lugs or feet at 14. Adjacent the upper edges, end walls 11 are cut away and notched at 15 to form bearings. A suitable closure or cover 16 is hinged along one side edge of the container 10 as at 17, preferably being cambered or curved as shown, having end walls 17ª to rest on the end walls at 10.

Adapted for removable disposition in the container 10 is a cylinder or drum 18 of any desired construction. This drum preferably has a body at 19 conical or cylindrical as preferred and a guard flange 20 at the larger end thereof. A trunnion 21 projects beyond the flange 20 and a trunnion 22 projects from and beyond the smaller end of the body 19. Said trunnions 21 and 22 are disposable in the bearings or notches 15 for rotation. The articles to be washed or cleansed are placed on the body 19 and as shown, may be disks of cream separators or the like such as the de Laval as suggested at 23. To facilitate arrangement of the disks on the body 19, ribs 24 and 25 are provided. Rib 25 is notched as at 26 to receive and space the disks. The disks 23 of the de Laval separator have four notches 26ª as enlargements of their center openings and one of them receives rib 24 and another receives rib 25. The disks used in the separator referred to are also of varying diameters and have openings of varying sizes. For this reason the body 19 is formed conical as shown to accommodate disks of varying sizes with openings of varying diameters, each disk seating in one of the notches 26, and it will be apparent that the portion of the rib 25 between adjacent notches will serve to separate the disks when in place on the body so that both sides of each disk may be cleansed at one operation. Disposable on the trunnion 22 intermediate the smaller end of body 19 and the adjacent wall 11 is a guard washer or disk 27.

In order to rotate the drum 18, a suitable connection is made thereto. For instance, a crank 28 may be provided having a handle as at 29. Crank 28 is adapted for detachable driving connection with trunnion 22 as by means of a square stud 30 on the crank adapted to enter a similarly shaped recess 31 in the free end of trunnion 22.

In use, water containing a suitable soap or detergent may be placed in the container 10 and the handle 29 operated to impart rotary movement to the drum 18 and accordingly to the disks 23 thereon, bringing them into intimate contact with the washing medium and thus effectively cleansing the disks. As will be understood, at desired times, the cover 16 may be raised, crank 28 detached, the drum 18 removed and the disks 27 removed therefrom so as to facilitate the attachment and detachment of the disks or other articles to be washed to and from the drum.

It will be realized that the disks 23 are arranged on the cylinder or drum 18 in the same order in which they are used in the separator hence the washing of them does not result in their disarrangement or relative order in which they are placed in the machine. This induces efficiency and avoids necessity of disarranging them incidental to washing as is now the case. It will further be seen that the disks are all held together on the drum or cylinder 18 and that the trunnions 21 and 22 form effective handles to facilitate carrying of the drum or cylinder with the disk in place thereon.

As it is preferred to wash the disks with the aid of steam, a suitable steam container or chest is provided as at 32, having a container section 33 provided with feet or rests at 34. A cover plate or closure 35 is provided for section 33, being hinged thereto as at 36. A steam supply pipe 37 may pass through one wall of the section 33 and within the section 33 and adjacent the top thereof terminate in a nozzle 38, for instance U-shaped as shown with its free ends closed by caps 39. Said nozzles have outlet ports or orifices at 40, inclined as shown.

The container 10 is adapted to be bodily placed within the section 33 being anchored against movement relatively thereto in any suitable manner as by means of recesses 41 in the bottom wall of section 33 entered by the lugs 14. In this instance, the crank 28 passes loosely through and is journaled in one end wall of the section 33 as at an opening 32.

With the container 10 disposed in the steam chest and closure 35 lowered, the steam will be discharged through the orifices 40, their angularity serving to direct the jets thereof into intimate cleansing contact with the drum 18 and the disks thereon, it being understood of course that during such operation, the closure 16 is open. During this operation, the crank 29 is turned as usual to impart rotary motion to the drum to bring all surfaces of the disks into the steam bath. It will be realized that water, through the condensation of steam, accumulates in the container 10 and that the disks will travel in the water in addition to being steamed. It will be understood of course that the steam carries a suitable cleansing medium if desired.

As merely one practical embodiment has been illustrated and described, it is to be understood that changes in the details may be resorted to provided they fall within the spirit and scope of the invention.

I claim as my invention:—

1. A washing apparatus comprising a container, a tapered drum mounted therein for rotation, said drum having ribs thereon, one of said ribs having spaced notches therein to receive articles placed on the drum to be washed, the parts of the rib between the notches spacing the articles apart on the drum.

2. Washing apparatus consisting of a container, the end walls of said container having bearing notches, a removable drum for said container having a conical body, said body having ribs extending therefrom, one of said ribs being provided with recesses, a guard flange at the larger end of said body, trunnions extending from both ends of said body and journaled removably in said notches, and means operable to rotate said drum.

3. Washing apparatus consisting of a container, the end walls of said container having bearing notches, a removable drum for said container having a conical body, said body having ribs extending therefrom, one of said ribs being provided with recesses, a guard flange at the larger end of said body, trunnions extending from both ends of said body and journaled removably in said notches, means operable to rotate said drum, a cover for the container disposable over the drum and notches, and rest members for the container.

4. Washing apparatus consisting of a steam chest, a steam discharge nozzle therein, a container removably disposable in said chest, means to prevent relative displacing movement of the chest and container, said container being disposed in the path of discharge of steam from said nozzle, a drum in the container for the articles for cleaning, and a detachable driving connection for said drum extending through a wall of the chest.

In testimony whereof I affix my signature in presence of two witnesses.

HERMAN C. BRAUNSCHWEIG.

Witnesses:
O. A. GROTH,
WALTER BRAUNSCHWEIG.